(12) United States Patent
Donlin et al.

(10) Patent No.: US 8,355,502 B1
(45) Date of Patent: Jan. 15, 2013

(54) EVOLVED CIRCUITS FOR BITSTREAM PROTECTION

(75) Inventors: Adam P. Donlin, Los Gatos, CA (US); Stephen M. Trimberger, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 1961 days.

(21) Appl. No.: 11/099,765

(22) Filed: Apr. 5, 2005

Related U.S. Application Data

(62) Division of application No. 10/436,971, filed on May 12, 2003, now Pat. No. 6,894,527.

(51) Int. Cl.
*H04L 29/06* (2006.01)
(52) U.S. Cl. .......................................... 380/37; 716/100
(58) Field of Classification Search ................. 716/1, 4, 716/7, 17; 326/8, 15, 37, 41, 101, 105; 711/145; 713/1, 100
See application file for complete search history.

(56) References Cited

U.S. PATENT DOCUMENTS

| | | | |
|---|---|---|---|
| 5,914,514 A | 6/1999 | Dejenfelt et al. | |
| 6,028,445 A | 2/2000 | Lawman | |
| 6,154,137 A * | 11/2000 | Goff et al. .................. | 340/572.4 |
| 6,265,266 B1 | 7/2001 | Dejenfelt et al. | |
| 6,363,517 B1 | 3/2002 | Levi et al. | |
| 6,363,519 B1 | 3/2002 | Levi et al. | |
| 6,366,117 B1 | 4/2002 | Pang et al. | |
| 6,378,122 B1 | 4/2002 | Levi et al. | |
| 6,418,131 B1 * | 7/2002 | Snelling et al. ............... | 370/337 |
| 6,430,736 B1 | 8/2002 | Levi et al. | |
| 6,480,954 B2 * | 11/2002 | Trimberger et al. ............. | 713/1 |
| 6,510,547 B1 | 1/2003 | Levi | |
| 6,539,532 B1 | 3/2003 | Levi et al. | |
| 6,647,328 B2 * | 11/2003 | Walker ........................... | 701/36 |
| 6,732,068 B2 * | 5/2004 | Sample et al. .................. | 703/24 |
| 6,751,642 B1 * | 6/2004 | Cambonie et al. ............ | 708/404 |
| 7,164,289 B1 * | 1/2007 | Choe et al. ..................... | 326/40 |
| 7,240,218 B2 * | 7/2007 | Kean ............................. | 713/193 |
| 7,340,596 B1 * | 3/2008 | Crosland et al. .............. | 713/100 |

OTHER PUBLICATIONS

"The Programmable Logic Data Book 1999"; pp. 6-60 to 6-68, available from Xilinx, Inc., 2100 Logic Drive, San Jose, CA 95124.

(Continued)

*Primary Examiner* — Kim Vu
*Assistant Examiner* — Leynna Truvan
(74) *Attorney, Agent, or Firm* — John J. King

(57) ABSTRACT

A security circuit for a reprogrammable logic IC includes an evolved circuit that ties the performance of the security circuit to the physical properties of that particular reprogrammable logic IC. The security circuit can be a decryption and/or encryption circuit that decrypts and/or encrypts, respectively, a configuration bitstream for the IC. Because of the link between the performance of the security circuit and the physical properties of the IC, the security circuit cannot be used in other ICs. For example, an encrypted bitstream that can be decrypted by the security circuit in a first IC will typically not be decrypted by the same security circuit in a second IC, since the physical properties of the two ICs will typically be different. The evolved circuit can comprise a portion of the security circuit, such as a security key generator, or it can comprise the full security circuit.

20 Claims, 11 Drawing Sheets

OTHER PUBLICATIONS

Tom Kean, "Secure Configuration of Field Programmable Gate Arrays," pp. 1-10, available from Algotronix Consulting, P.O. Box 23116, Edinburgh EH8 8YB, United Kingdom.

Timothy G. W. Gordon et al., "On Evolvable Hardware," *Soft Computing in Industrial Electronics*, 2002, pp. 279-323, Physica-Verlag, Heidelberg, Germany.

Adrian Thompson, "Temperature in Natural and Artificial Systems," Proc. 4th European Conference on Artificial Life (ECAL97), 1997, pp. 388-397, Husbands P. and Harvey, I. (eds.), MIT Press.

Thompson, Adrian, "Evolving Electronic Robot Controllers that Exploit Hardware Resources CSRP 368", Proceedings of the $3^{rd}$ European Conference on Artificial Life (ECAL95), Granada, Spain, Jun. 4-6, 1995, Springer Verlag, 12 pages.

* cited by examiner

US 8,355,502 B1

EVOLVED CIRCUITS FOR BITSTREAM PROTECTION

FIELD OF THE INVENTION

This invention relates generally to reprogrammable logic integrated circuits, and more particularly, to encryption methods for bitstreams.

BACKGROUND OF THE INVENTION

The architecture of a field programmable gate array (FPGA) typically includes an array of configurable logic blocks (CLBs) surrounded by programmable input/output blocks (IOBs). The IOBs provide the interface between the package pins and the CLBs, whereas the CLBs provide the functional elements for constructing logic on the FPGA. The CLBs and IOBs are interconnected by a hierarchy of programmable routing resources. The CLBs, IOBs, and programmable routing resources contain configuration memories that must be configured before each CLB, IOB, or routing resource can perform a specified function.

Typically, the configuration memories within an FPGA use static random access memory (SRAM) cells that are programmed by loading a configuration bitstream into the FPGA. Specific examples for configuring various FPGAs can be found on pages 6-60 to 6-68 of "The Programmable Logic Data Book 1999" (hereinafter "The Xilinx 1999 Data Book"), published in March, 1999 by Xilinx, Inc., and available from Xilinx, Inc., 2100 Logic Drive, San Jose, Calif. 95124, which pages are incorporated herein by reference. Additional methods to program FPGAs are described by Lawman in U.S. Pat. No. 6,028,445, entitled "DECODER STRUCTURE AND METHOD FOR FPGA CONFIGURATION" by Gary R. Lawman, filed Dec. 30, 1997 and issued Feb. 22, 2000. U.S. Pat. No. 6,366,117 entitled "NONVOLATILE/BATTERY-BACKED KEY IN PLD" by Pang et al., filed Nov. 28, 2000 and issued Apr. 2, 2002, describes structures and methods for using encrypted bitstreams in FPGAs. These patents are also incorporated herein by reference.

A configuration bitstream provides a portable, convenient means for a vendor to distribute configuration information (sometimes referred to as intellectual property, or IP) for proprietary system designs to users. The user benefits from this IP because the user does not need to spend the time or resources to develop the logic implemented by the bitstream, while the vendor profits from being able to sell the same IP to multiple users. However, this very same ease of distribution also makes bitstream IP highly susceptible to unauthorized use, since stolen or otherwise unauthorized copies of configuration bitstream data can be used to configure any number of FPGA systems. Therefore, configuration bitstreams are typically encrypted to prevent this type of misappropriation.

FIG. 1a shows a conventional FPGA 100a that includes bitstream decryption circuitry. FPGA 100a includes a secure key register 110a powered by a battery backup 111, a bitstream decoder circuit 130, programming circuitry 140, and reprogrammable logic 150 (which includes configuration memory, CLBs, IOBs, and programmable routing resources). An encrypted configuration bitstream BSe is provided to bitstream decoder circuit 130, which also receives a decryption key KEY from secure key register 110a. Using decryption key KEY, bitstream decoder circuit 130 decrypts encrypted bitstream BSe and provides a decrypted bitstream BSd to programming circuitry 140. Programming circuitry 140 then loads decrypted bitstream BSd into reprogrammable logic 150 to configure FPGA 100a.

FIG. 1b shows another conventional FPGA 100b that includes bitstream decryption circuitry, but avoids the requirement of a battery backup by incorporating a permanent decryption key storage structure. Like FPGA 100a shown in FIG. 1a, FPGA 100b includes a bitstream decoder circuit 130 for decrypting an encrypted bitstream BSe and programming circuitry 140 that loads decrypted bitstream BSd from bitstream decoder circuit 130 into reprogrammable logic 150 through programming circuitry 140. However, rather than using a battery-backed register to store and provide decryption key KEY to bitstream decoder circuit 130, FPGA 100b includes an embedded key structure 110b that is, for example, formed during device fabrication using custom masks, or during a post-fabrication modification process using a localized technique such as laser etching, antifuse programming, or programming of a non-volatile memory.

By using encrypted bitstream BSe, both FPGAs 100a and 100b make the copying of customer IP much more difficult, since the encrypted bitstream cannot be used without decryption key KEY. However, this enhanced bitstream protection increases design and production costs, as the vendor must implement either a battery backup system or else must incorporate custom processing steps to create an embedded key structure. Furthermore, if an unauthorized copyist obtains decryption key KEY, the protection of the bitstream IP is completely lost. FPGAs 100a and 100b attempt to maintain decryption key security by storing decryption key KEY within internal registers (i.e., secure register 110a and embedded key structure 110b, respectively), so that decryption key KEY cannot simply be read off of any of the FPGA I/O pins. However, a dedicated copyist can still probe the internal (die) connections of secure key register 110a (shown in FIG. 1a) or embedded key structure 110b (shown in FIG. 1b) to extract decryption key KEY.

Accordingly, it is desirable to provide a system and method for protecting bitstream IP that minimizes the possibility of unauthorized configuration bitstream use.

SUMMARY OF THE INVENTION

The present invention uses evolved circuits (sometimes referred to as "evolutionary electronics") to implement an IC-specific security circuit (i.e., a circuit associated with the identification of the particular IC and/or the protection of data for or from that IC, such as configuration data, program data, etc.). An evolved circuit is a circuit developed via an evolutionary process, i.e., a process that iterates through a variety of circuit configurations until a desired functionality is obtained. The use of an evolutionary process results in a final circuit having performance characteristics that are associated with a set of physical properties of the particular reprogrammable logic IC in which that final circuit is implemented. In contrast, conventional (i.e., non-evolved) circuits are designed to operate consistently across all reprogrammable logic ICs in which the circuit can be implemented, and are therefore expressly not associated with the physical properties of a particular reprogrammable logic IC.

According to an embodiment of the invention, a decryption circuit in a reprogrammable logic IC includes an evolved circuit for providing a security key to a bitstream decoder circuit and/or a bitstream encoder circuit. The security key allows the bitstream decoder circuit to decrypt a configuration bitstream previously encrypted using that same security key, for example, by the bitstream encoder circuit. By performing configuration bitstream encryption and decryption entirely within the IC, the security key can remain inside the IC at all times and need never be made available outside the IC, thereby enhancing bitstream security.

According to various embodiments of the invention, the evolved circuit can generate the security key automatically upon device startup or can generate the security key in response to a predetermined input. In either case, because of the inherent variation in device physical properties, the same evolved circuit can be used in different reprogrammable logic ICs to provide a unique security key for each device. Each security key can then be used to encrypt configuration bitstreams for use only with the associated reprogrammable logic IC. Probing the die of a reprogrammable logic IC to read out the security key generated by an evolved circuit can be difficult, if not impossible, since the intrusive nature of such die probing will typically alter the physical properties of the target device, thereby altering the output of the evolved circuit.

According to another embodiment of the invention, the entire decryption circuit and/or encryption circuit is developed using an evolutionary process. The evolved circuit can then perform the entire decryption and/or encryption operation. According to another embodiment of the invention, the evolved circuit can include a security key generation circuit for generating a security key to encrypt/decrypt the configuration bitstream. According to another embodiment of the invention, the evolved circuit can provide the desired configuration bitstream directly from a predetermined input bitstream.

The decryption and encryption circuits described above can be implemented using a portion of the logic resources in a reprogrammable logic IC, and can be configured at least in part by an evolved circuit bitstream. According to an embodiment of the invention, a configuration bitstream can include the evolved circuit bitstream as part of a decryption circuit bitstream followed by the encrypted configuration bitstream. The necessary decryption circuitry is then configured before the encrypted configuration bitstream is received. According to another embodiment of the invention, the decryption circuit bitstream is separate from the encrypted configuration bitstream, and is loaded into the reprogrammable logic IC some time before the encrypted configuration bitstream is input.

According to another embodiment of the invention, a configuration bitstream can include the evolved circuit bitstream as part of an encrypted circuit bitstream followed by an unencrypted configuration bitstream, so that the resulting encryption circuitry can be used to encrypt the unencrypted configuration bitstream. According to another embodiment of the invention, the encryption circuit bitstream is separate from the unencrypted configuration bitstream, and is loaded into the reprogrammable logic IC some time before the unencrypted configuration bitstream is input.

The present invention will be more fully understood in view of the following description and drawings.

DETAILED DESCRIPTION OF THE DRAWINGS

Figure 1A:
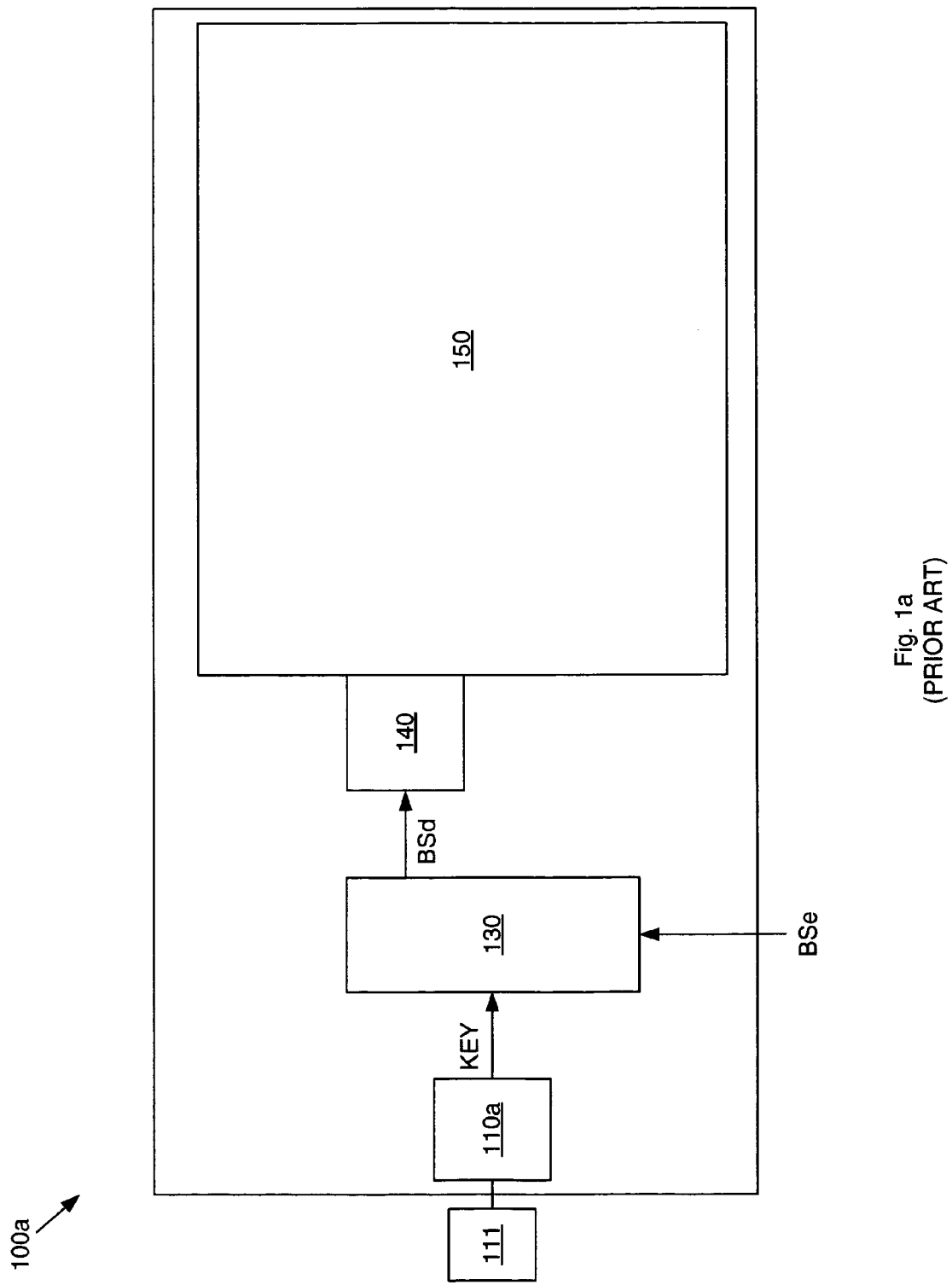
FIGS. 1a and 1b are schematic diagrams of FPGAs that include conventional bitstream decryption circuits.
Figure 1B:
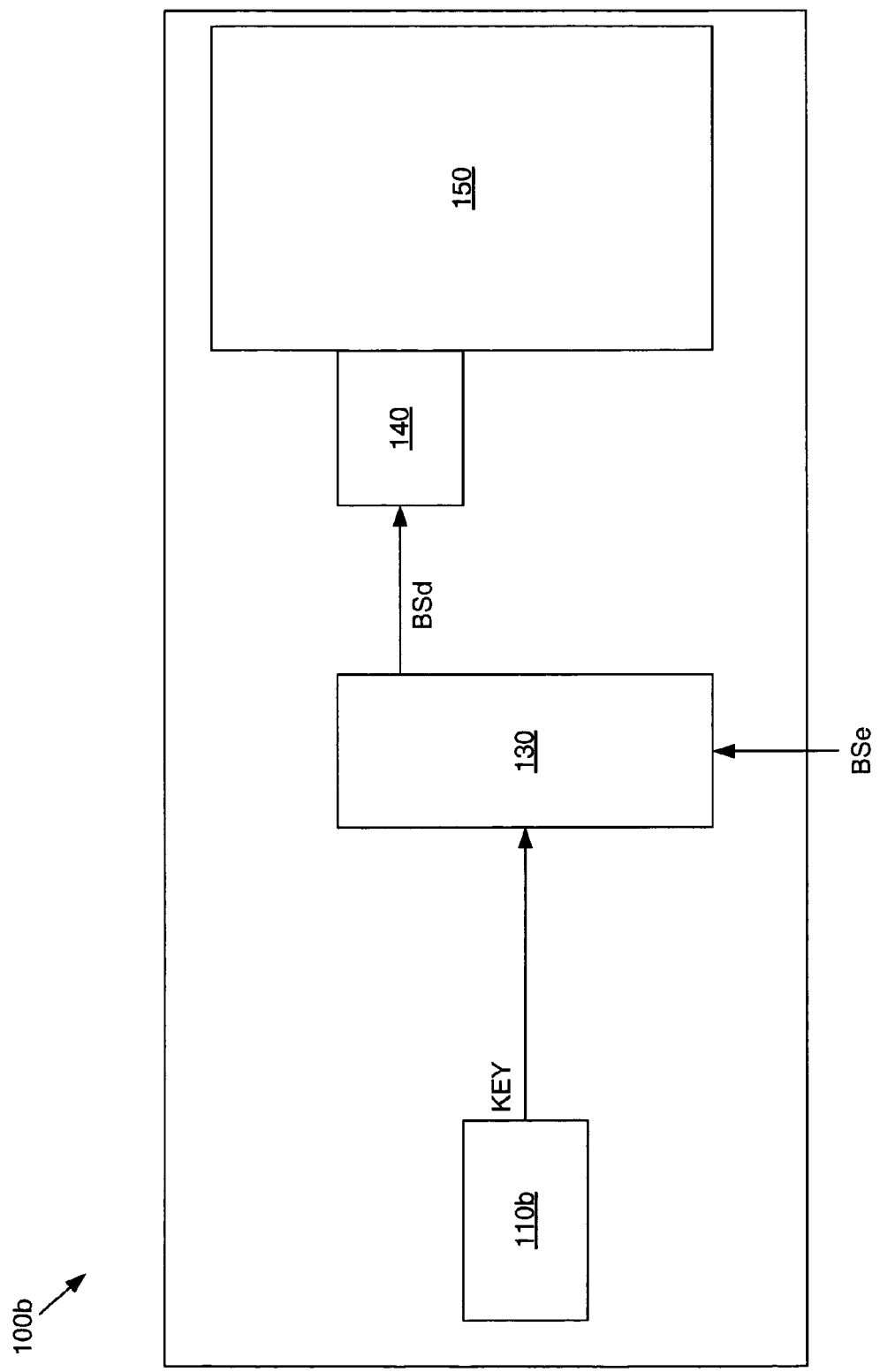

The invention incorporates an evolved circuit into a decryption circuit for a reprogrammable logic IC, thereby advantageously linking a bitstream decryption process with physical properties of a particular reprogrammable logic IC to prevent unauthorized use of bitstream IP.

An evolved circuit is a circuit developed via an evolutionary process, i.e., a process that iterates through a variety of circuit configurations until a desired functionality is obtained. Evolved circuits are typically discussed with respect to FPGAs, due to the relatively high density of reprogrammable logic of such devices. However, an evolved circuit can be implemented in any reprogrammable logic device having reprogrammable logic resources (e.g., many ASICs now incorporate FPGA-like reprogrammable elements). Therefore, for purposes of the present invention, the term "reprogrammable logic IC" will be used to denote any IC that includes reprogrammable logic resources.

An evolved circuit is developed by applying an iterative configuration process to a set of logic resources in a reprogrammable logic IC until a predetermined evaluation function is satisfied. This evolutionary process is described in detail in "On Evolvable Hardware," by Timothy G. W. Gordon and Peter J. Bentley (Ovaska, S. and Sztandera, L. (Ed.), *Soft Computing in Industrial Electronics*, Physica-Verlag, Heidelberg, Germany, pp. 279-323 (2002)) and in "Temperature in Natural and Artificial Systems," by Adrian Thompson (Proc. 4$^{th}$ Eur. Conf. on Artificial Life (ECAL97), Husbands, P. and Harvey, I. (Eds.), 388-397, MIT Press (1997)). Another description of a process for evolving circuits and their related bitstreams is provided by Levi and Guccione in U.S. Pat. No. 6,430,736 issued Aug. 6, 2002 and entitled "Method and Apparatus for Evolving Configuration Bitstreams".

Unlike conventional circuit design methods, in which an initial algorithm is defined and then refined to achieve an acceptable level of performance, an evolutionary process first defines the desired performance or results (i.e., the evaluation function) and then iterates through various logic configurations until that desired performance or result is achieved. While a non-evolved circuit may go through several revisions before being finalized, such revisions are unlike the iterative reconfigurations performed during an evolutionary process, since the evolutionary process is not constrained by conventional design rules (although such design rules can be used to guide the evolutionary process if desired) and therefore can exploit the physical properties of the IC. For example, the evolutionary process for an evolved circuit often comprises random permutations of the configuration bitstream. Consequently, the final logic resource configuration of an evolved circuit is associated with the physical properties of a particular IC on which the logic resources are formed.

For instance, due to unavoidable process variations, different ICs formed on a single wafer can have slightly different performance characteristics. More specifically, the devices and interconnects of those ICs can have varying physical properties, such as operating speed, threshold voltage, etc. Conventional non-evolved circuit designs compensate for this inherent variation by implementing design rules that provide sufficient operating tolerances to accommodate small physical property variations. Therefore, conventional circuits are not associated with the physical properties of an IC, but rather are based on standard structures and configurations that can be used without regard to the particular physical properties of an IC. For example, buffers are typically used to add delays in signal transmissions within a circuit to ensure that logical operations follow a desired timing by masking any signal transmission speed variations between ICs.

In contrast, an evolved circuit might not include any such delay elements, and could rely instead on a layout that works with the actual speed of signal transmissions to provide the desired timing of logic operations. The iterative evolutionary process used to develop the evolved circuit can settle on a design that is explicitly associated with the physical properties of a particular IC. Consequently, an evolved circuit can be much more efficient (in terms of layout area and/or performance) than a conventionally designed circuit, since logic resources do not have to be "wasted" to accommodate physical property variations between ICs.

At the same time, because the proper performance of an evolved circuit will depend on at least one physical property specific to a particular IC, evolved circuits are typically not "portable." In other words, a logic resource configuration that defines an evolved circuit for a particular IC will generally not function in the same manner in a different IC, since the different IC will have different physical properties.

This lack of portability makes evolved circuits particularly suited for security applications in an IC. According to an embodiment of the invention, IC-specific bitstream security is provided by creating a decryption circuit for a reprogrammable logic IC that includes an evolved circuit. Bitstream IP for that IC can then be encrypted so that it can only be decrypted by the decryption circuit implemented in that particular IC.

According to an embodiment of the invention, this encryption can be performed by a dedicated encryption circuit. According to another embodiment of the invention, the decryption circuit itself can include additional logic for assisting in, or even directly performing, the actual encryption of the original bitstream IP. The evolved circuit, whether comprising a portion or all of the decryption circuit, ensures that the behavior of the decryption circuit is associated with the physical properties of the IC in which it is implemented. Therefore, the encrypted bitstream intended for a particular IC will only be properly decrypted when the decryption circuit is implemented in that particular IC.

Figure 2:
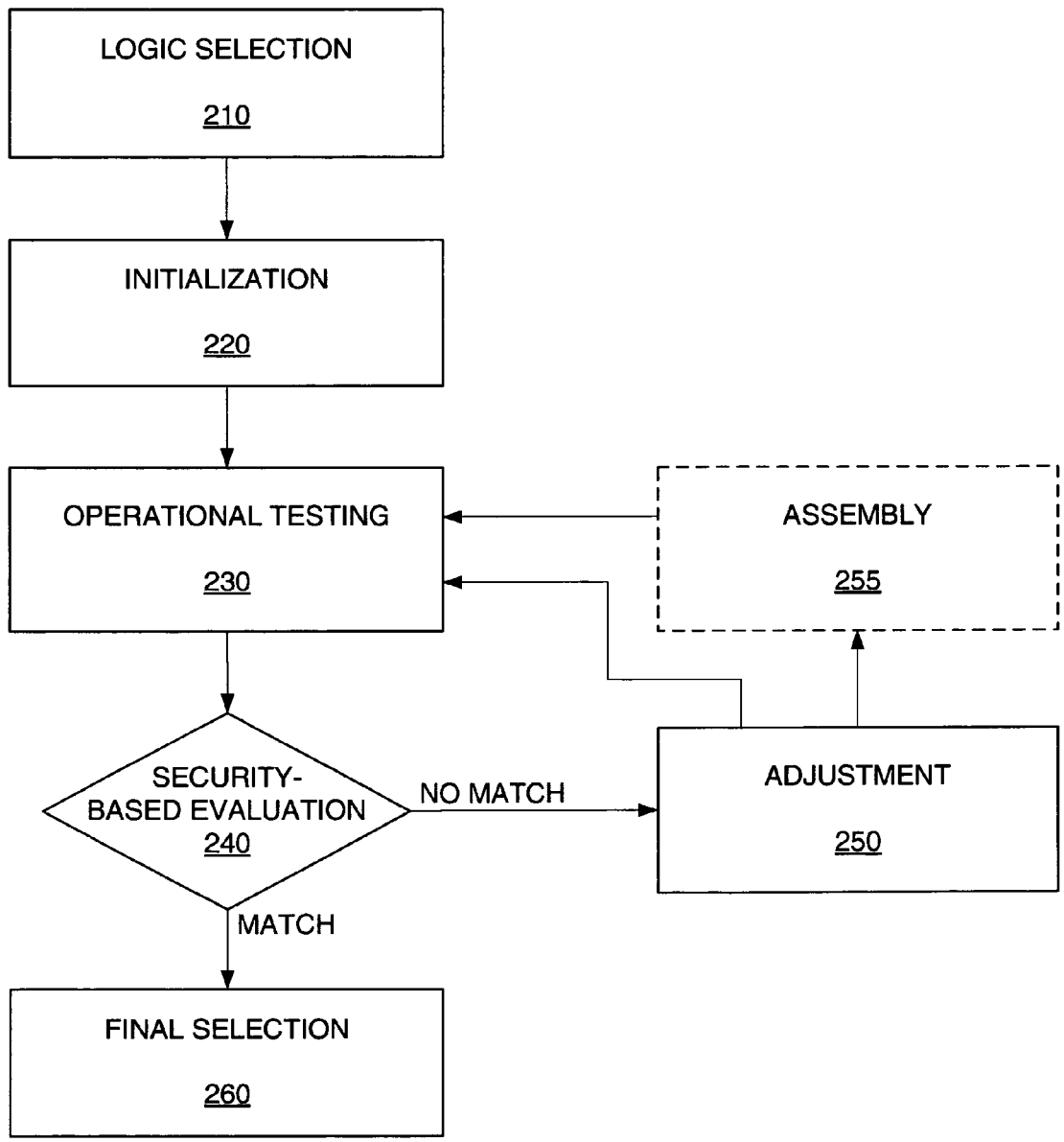
FIG. 2 is a flow diagram of an evolutionary process for an evolved circuit for use in a decryption circuit in accordance with an embodiment of the invention.

FIG. 2 shows a flow diagram of a method for developing an evolved circuit for an identifier circuit for a reprogrammable logic IC in accordance with one embodiment of the invention. In this particular example, the evolved circuit comprises a decryption circuit, since a security-based evaluation function is applied (as described with respect to step 240 below). As noted above, the final evolved circuit can comprise a full decryption circuit for decrypting an encrypted bitstream, or a portion of a decryption circuit, such as a decryption key generator. Note that while the evolution of a decryption circuit is described in FIG. 2 for explanatory purposes, the method can be used to develop any type of identifier circuit, such as a generator for a unique identifier (ID).

Note further that because the behavior of an evolved circuit is associated with random variables (e.g., the physical properties of a specific IC), it is unlikely, but possible, that identical IDs (or security keys) could be generated by two different ICs. However, most evolved circuits can produce outputs (IDs, security keys, etc.) that are substantially unique (e.g., less than a 50% chance of output duplication in a different IC), and in most cases can be selected to provide an arbitrarily small chance of output duplication.

In logic selection step 210, a development set of reprogrammable logic resources (e.g., selected CLBs, IOBs and programmable routing resources in an FPGA) from the reprogrammable logic IC is selected for use in the evolved circuit. The development set can comprise any predetermined portion of the reprogrammable logic resources, and can even include non-contiguous reprogrammable logic resources within the IC. The development set can be defined, for example, by the IC manufacturer, or by a user creating bitstream IP for the IC.

Then, in initialization step 220, an initial candidate bitstream is loaded into the development set to place the development set into an initial configuration. Because the evolutionary process is an iterative process, this initial configuration can comprise any logic resource configuration, including a random configuration, a predetermined "seed" configuration, or a sample configuration having a performance known to generally resemble the desired performance of the evolved circuit.

In an operational testing step 230, the configured development set is operated in its expected manner to generate a test output. A predetermined evaluation function is then applied to this output in a security-based evaluation step 240. A security-based evaluation step (i.e., an evaluation step based on encryption, decryption, identification, or other security-related applications) advantageously allows the method of FIG. 2 to generate an evolved circuit specifically directed towards a security circuit for the IC. The specific security-related evaluation function applied depends on the desired operation of the final evolved circuit.

As noted above, according to various embodiments of the invention, the evolved circuit in a decryption circuit can comprise anything from a security key generator to the entire decryption circuit. Therefore, the evaluation function used to develop a particular evolved circuit will be derived from the security-based performance requirements that are specific to that particular evolved circuit. For example, the evaluation function for a security key generator can simply comprise a constant output function, whereas the evaluation function for a full decryption circuit might define the generation of a desired configuration bitstream from an input bitstream (e.g., an encrypted bitstream).

If the sample output does not match the target output of the evaluation function, then the candidate bitstream is modified and reloaded into the development set in adjustment step 250. Typically, this modification is performed by an automated design tool (e.g., bitstream generation software running on a personal computer or a standalone device programmer that includes bitstream modification logic), since the evolutionary process often requires a large number of iterations. As described above, the modification performed during adjustment step 250 can simply be a random permutation or can be a more "guided" modification (e.g., based on simplified design rules).

Note further that the candidate bitstream can be wholly dedicated to configuring an evolved circuit, or the candidate bitstream can include portions dedicated to an evolved circuit and other portions dedicated to "static" (i.e., non-evolved) circuits (examples of both types of bitstreams are described below with respect to FIGS. 5*a* and 5*b*). If the candidate bitstream includes both evolved circuit and static circuit configuration bits, then the static circuit configuration bits can be locked so that they cannot be modified during the iterations of adjustment step 250. Alternatively, the static circuit configuration bits can be maintained separately from the evolved circuit configuration bits during adjustment step 250 and then can be integrated with the evolved circuit bits in an optional assembly step 255 before being loaded back into the reprogrammable logic IC.

The process then loops back to testing step 230, where a new test output is generated by the development set, and the evaluation function is again applied in evaluation step 240. In this manner, various configurations for the development set are tested in an iterative process. When the development set satisfies the evaluation function (i.e., when the sample output from a particular configuration matches the target output), the candidate bitstream used for that particular configuration is selected as the final evolved circuit bitstream in a final selection step 260. Note that testing step 230, evaluation step 240, adjustment step 250, and optional assembly step 255 form an automated iterative configuration process that allows the evolutionary process to efficiently cycle through a large number of candidate bitstreams, and therefore a large number of development set configurations. By providing an automated means for evaluating any particular candidate bitstream, the evaluation function (step 240) directs the iterative evolution in a manner that does not require any manual intervention or guidance.

Figure 3A:
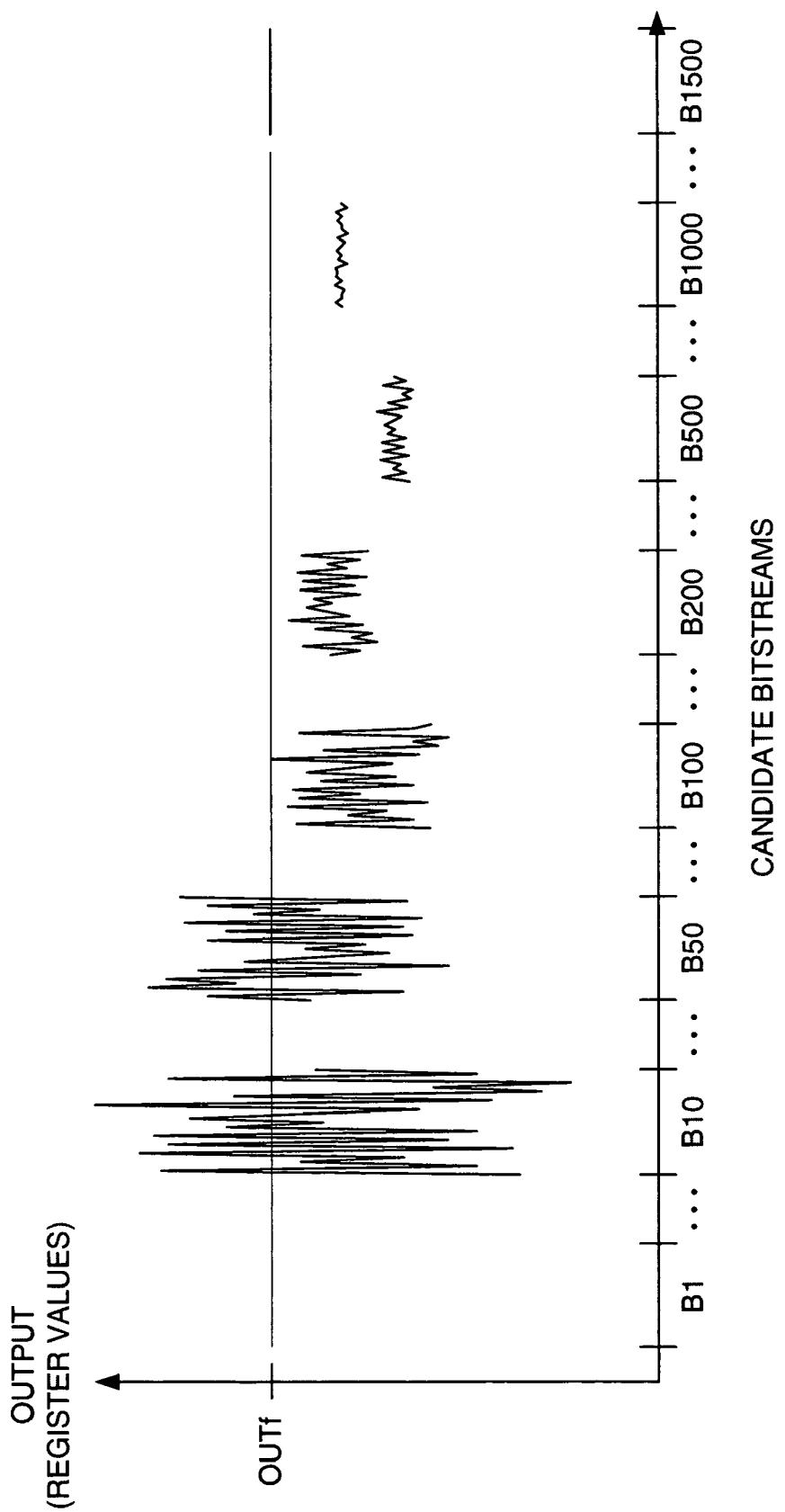
FIG. 3a is a sample graph of outputs over the course of an evolutionary process used to develop a key generator in accordance with an embodiment of the invention.

FIG. 3*a* shows an example progression of outputs that could be generated over the course of an evolutionary process for developing a key generation circuit for a reprogrammable logic IC. The graph in FIG. 3*a* depicts the output of a set of logic resources configured by a candidate bitstream Bx, where x is the iteration of the particular candidate bitstream. The output can, for example, represent a series of register values generated by the circuit configured by a candidate bitstream. The evaluation function for the candidate bitstreams can then simply define a constant non-zero output (e.g., for use as a security key). Thus, the lack of output provided by an initial candidate bitstream B1 does not meet the required evaluation function output. The tenth candidate bitstream B10 does provide an output signal, but since it is a wildly varying register output, it too is unacceptable. Accordingly, the iterations to the candidate bitstreams continue (i.e., through bitstreams B50, B100, B200, 8500, B1000) until a constant output OUTf is provided by candidate bitstream B1500. In this manner, the evaluation function directs the iterative process until an acceptable candidate bitstream is realized. The evolved circuit configured by candidate bitstream B1500 can then be used to generate a security key (i.e., output OUTf) for the reprogrammable logic IC.

Note that output signal OUTf can be a predetermined signal (e.g., a predetermined logic state, sequence of bits, or sequence of output transitions), in which case the evaluation function can comprise a constant output function that specifies output signal OUTf. Alternatively, output signal OUTf can be any signal to which the evolutionary process converges, in which case the evaluation function can comprise a constant output function that merely specifies that the evolved circuit provide a constant output. Note further that the evaluation function can be applied across a range of input and environmental conditions to ensure output stability regardless of temperature and/or voltage variations. Also, the size and characteristics of output signal OUTf can be selected according to the desired type of encryption to be applied to the bitstream IP.

In an example of an evaluation function suitable for security applications, output signal OUTf can be generated by a first counter and a second counter. The first counter can be within or controlled by the evolved circuit, and can be clocked at a weakly specified frequency—i.e., the precise frequency (and stability) of the first counter will depend on the evolved circuit and, in particular, on the physical properties of the IC in which it resides. Note that other attributes, such as the size of the counter, can also be defined by the evolved circuit.

The second counter, which can either be an evolved or static circuit, can then be used to capture counter results from the first counter at regular intervals, thereby generating counter values OUTf that can be used to form a security key. This security key can be used to encrypt and decrypt configuration bitstreams to be used in that device. Note that the same evolved design can be used for multiple ICs, as the differing physical properties of different ICs will typically result in different clocking frequencies for the first counter, and therefore, different security keys for different ICs. A security key formed by an evolved design can then be used in a variety of ways to secure the IC and/or the bitstream IP that can be used in the IC.

Figure 3B:
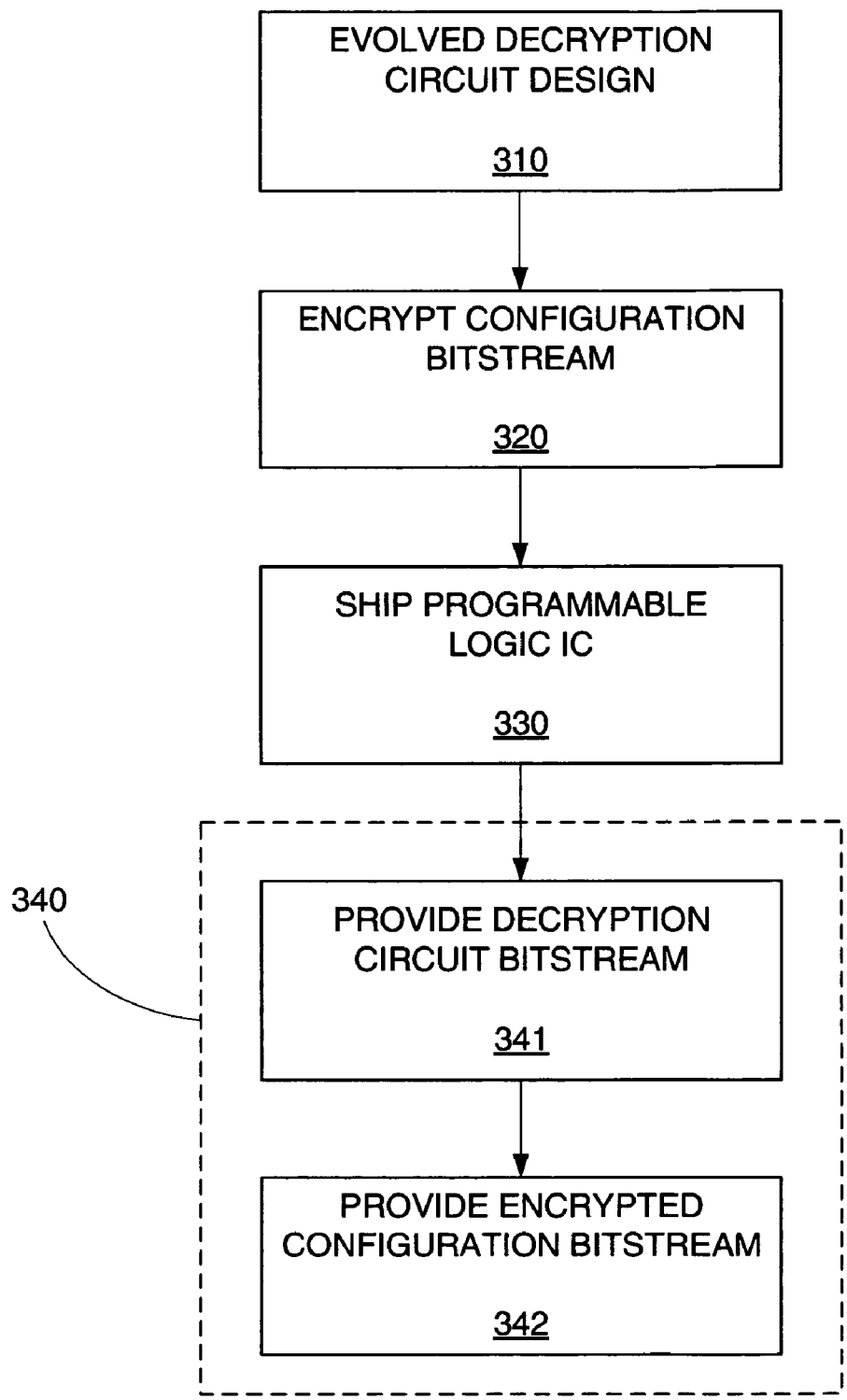
FIG. 3b is a flow diagram of a method for distributing protected bitstream IP to users in accordance with an embodiment of the invention.

For example, FIG. 3*b* shows a flow diagram of a method for distributing protected bitstream IP to a user, according to an embodiment of the invention. In an evolved decryption circuit design step 310, a decryption circuit for an IC is developed using an evolutionary process (for example, as described above with respect to FIG. 2). Then, in an encrypt configuration bitstream step 320, a configuration bitstream for the IC is encrypted such that it can be decrypted by the decryption circuit designed in step 310 (for example, using a security key generated in the manner described with respect to FIG. 3*a*).

The IC is shipped to the user in a ship programmable logic IC step 330. The bitstream for the decryption circuit and the encrypted configuration bitstream are then provided to the user in a provide decryption circuit bitstream step 341, and a provide encrypted configuration bitstream step 342, respectively. In this manner, the configuration bitstream IP is restricted to the particular IC used in step 310, and the user can only access the configuration bitstream IP with that particular IC. Note that the decryption circuit bitstream and encrypted configuration bitstream can be provided in a single bitstream, as indicated by a combined step 340 that surrounds both steps 341 and 342 (discrete and combined decryption circuit and encrypted configuration bitstreams are described in greater detail below with respect to FIGS. 5*a*-5*d*).

A different evaluation function can specify an output signal consisting of a sequence of bits having the same length as the configuration bitstream being loaded. An XOR operation can then be performed on the configuration bitstream and the output signal to encrypt the configuration bitstream. This XOR operation essentially creates a "one time pad cipher" because the device-specific performance characteristics of the evolved circuit provide reasonably random output signals for different ICs.

As noted above, the evolved circuit configured by evolved bitstream 81500 will perform as expected only in the specific reprogrammable logic IC used in the evolutionary process. Because the evolved circuit is associated with the physical properties of the particular reprogrammable logic IC in which it was developed, and because different ICs will have different physical properties, the behavior of the evolved circuit varies from IC to IC. Accordingly, the evolved circuit configured by development bitstream B1500 enables the implementation of a decryption circuit that is tailored to a specific IC.

Figure 4A:
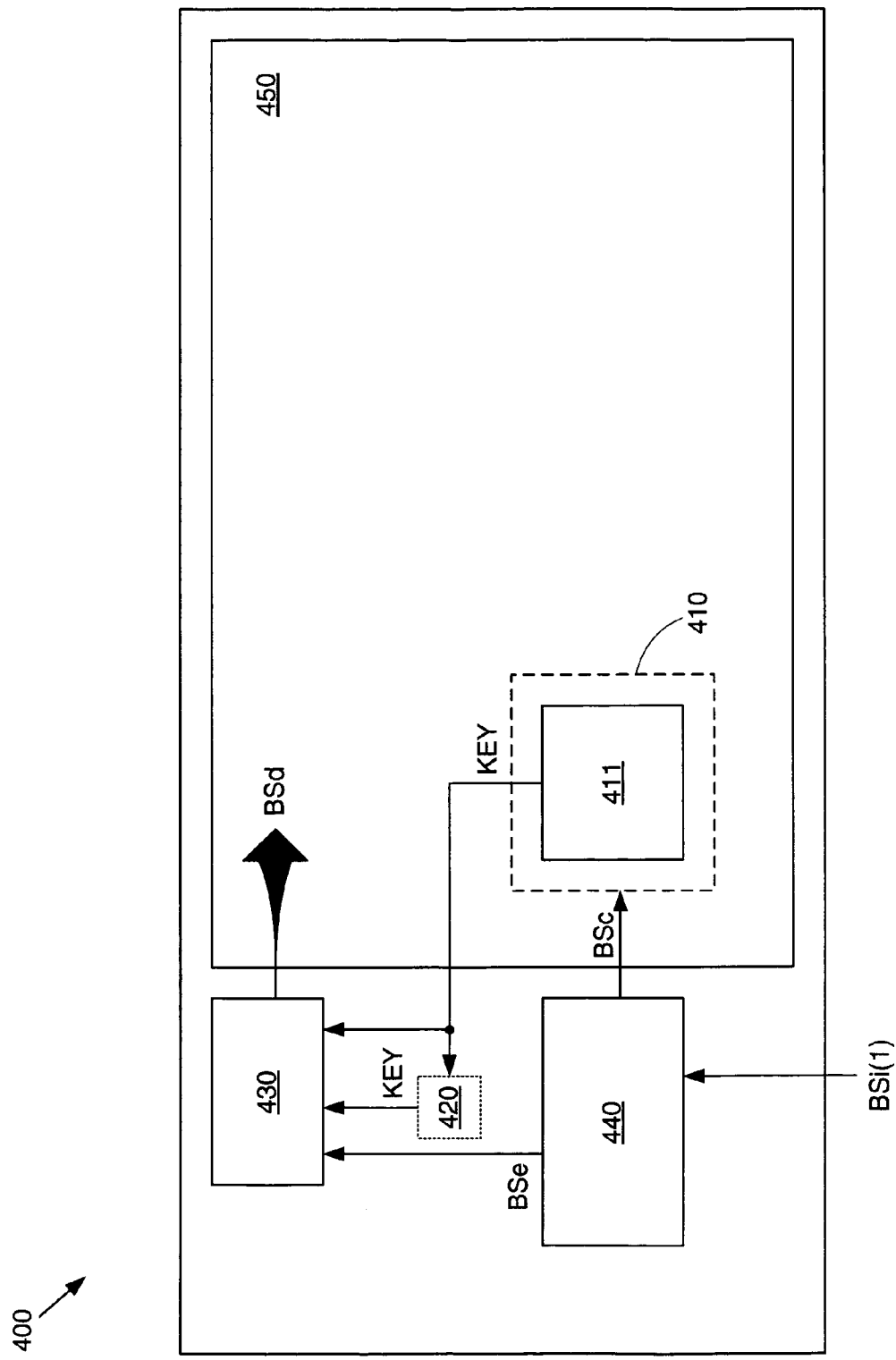
FIG. 4a is a schematic diagram of a reprogrammable logic IC including a decryption circuit in accordance with an embodiment of the invention.

FIG. 4a shows a reprogrammable logic IC 400 that includes an evolved circuit in accordance with an embodiment of the invention. IC 400 includes programming circuitry 440, a bitstream decoder 430, an optional key register 420, and reprogrammable logic resources 450 (which can include CLBs, IOBs, and programmable routing resources (not shown for clarity)). Programming circuitry 440 is coupled to receive an input bitstream BSi(1), which includes an evolved circuit bitstream BSc and an encrypted bitstream BSe. Programming circuitry 440 receives input bitstream BSi(1) and passes evolved circuit bitstream BSc to a development set 410 that comprises a predetermined portion of reprogrammable logic resources 450. Evolved circuit bitstream BSc then configures development set 410 into an (evolved circuit) key generator 411 that generates a security key KEY.

Key generator 411 provides security key KEY to bitstream decoder 430, either directly or via optional key register 420. Bitstream decoder 430 can comprise any conventional decoder circuit for decrypting a bitstream using a security key. Encrypted bitstream BSe, previously encrypted using security key KEY, is also provided to bitstream decoder 430 by programming circuitry 440. Using security key KEY, bitstream decoder 430 decrypts encrypted bitstream BSe to generate decrypted configuration bitstream BSd. Decrypted configuration bitstream BSd is then provided to reprogrammable logic resources 450 to provide the desired configuration for reprogrammable logic IC 400.

Figure 4B:
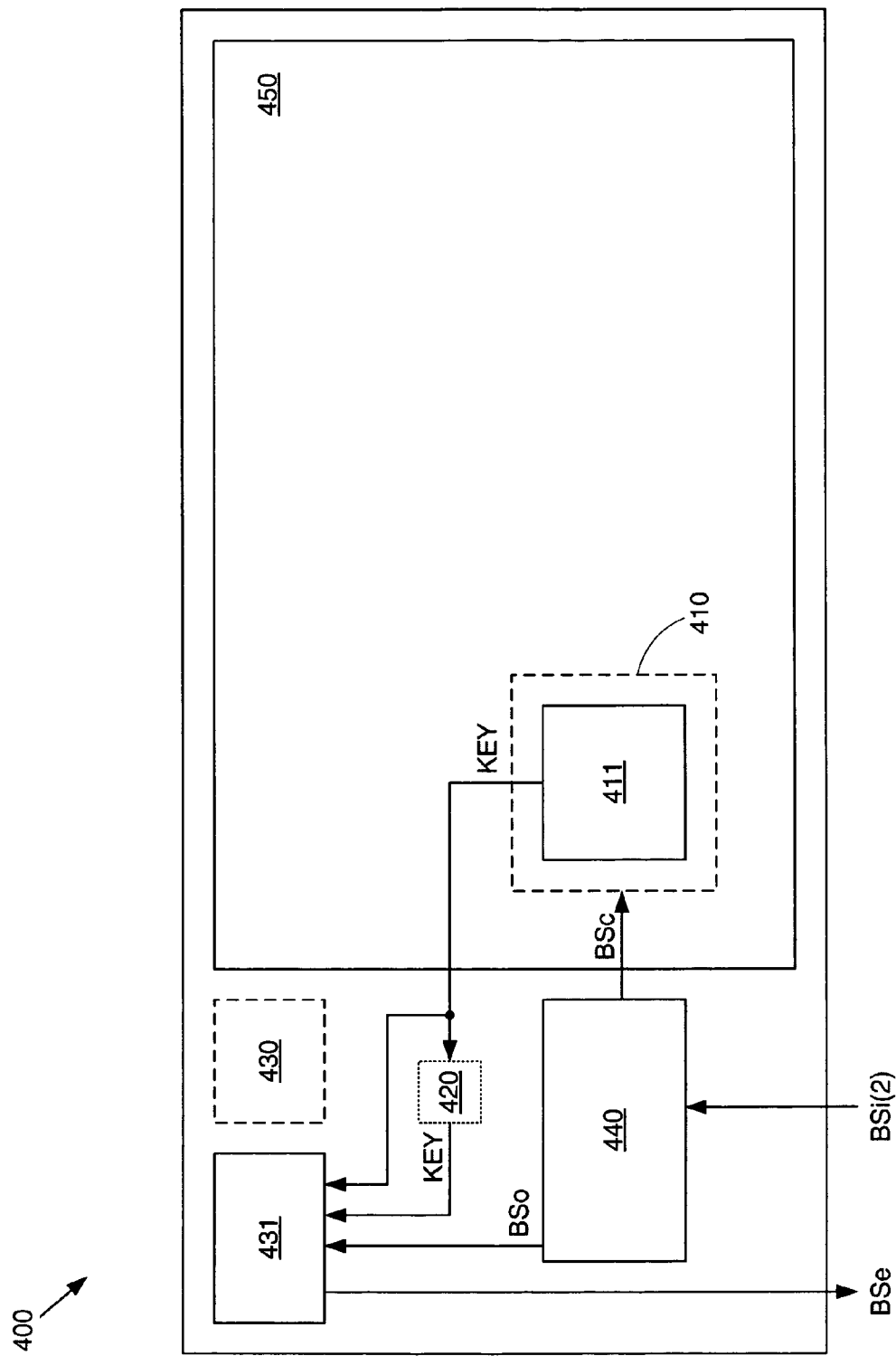
FIG. 4b is a schematic diagram of the reprogrammable logic IC of FIG. 4a including an encryption circuit in accordance with another embodiment of the invention.

Note that encrypted bitstream BSe could have been originally generated by IC 400, using evolved circuit key generator 411. For example, FIG. 4b shows IC 400 as including a bitstream encoder 431. Programming circuitry 440 is coupled to receive an input bitstream BSi(2). Input bitstream BSi(2) includes the same evolved circuit bitstream BSc as input bitstream BSi(1), but replaces the encrypted bitstream BSe of input bitstream BSi(1) with an original (unencrypted) bitstream BSo. Programming circuitry 440 passes evolved circuit bitstream BSc to development set 410 to configure key generator 411. Because the same evolved circuit bitstream BSc is being used in the same IC 400, the security key KEY generated by key generator 411 in both FIGS. 4a and 4b is the same. Security key KEY is then passed to bitstream encoder 431, either directly or via optional key register 420. Bitstream encoder also receives original bitstream BSo from programming circuitry 440, and uses security key KEY to encrypt original bitstream BSo into encrypted bitstream BSe.

Bitstream encoder 431 therefore allows the encryption operation to be performed entirely within IC 400. Because the decryption operation is also performed entirely within IC 400 (as described with respect to FIG. 4a), security key KEY does not have to be read out from reprogrammable logic system 400, thereby enhancing bitstream security. In another example, key register 420 can be a nonvolatile memory that persistently stores security key KEY. After a bitstream is encrypted by bitstream encoder 431, security key KEY generated by evolved circuit key generator 411 can be stored in a nonvolatile key register 420. When the encrypted bitstream is to be decrypted by bitstream decoder 430, security key KEY can be retrieved directly from nonvolatile key register 420 and without the need for evolved circuit key generator 411. Thus, bitstream security is further enhanced if nonvolatile key register 420 can only be used to decrypt encrypted bitstreams in connection with bitstream decoder 430.

Note that encrypted bitstream BSe (or original bitstream BSo) can be included in the same input bitstream BSi that provides evolved circuit bitstream BSc, or encrypted bitstream BSe (or original bitstream BSo) can be provided to reprogrammable logic IC 400 as a completely separate input bitstream.

Figure 5A:
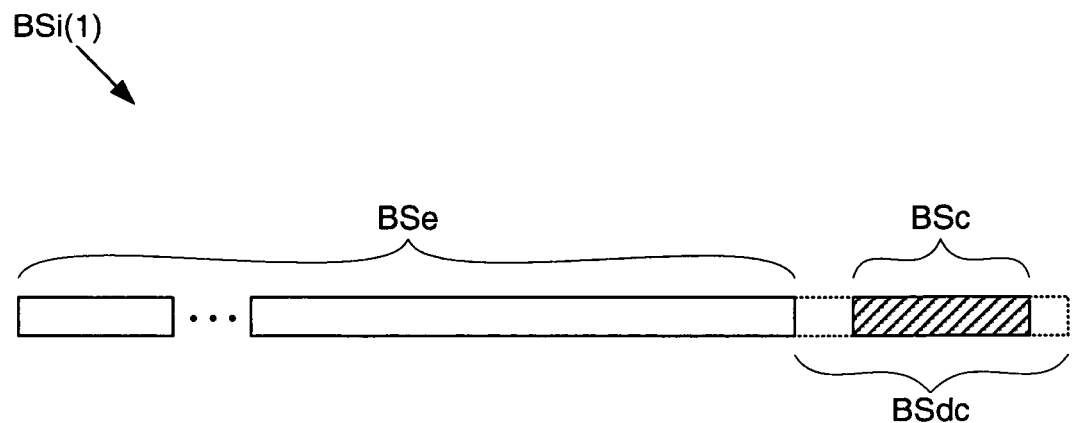
FIG. 5a is a schematic diagram of a bitstream including both an evolved circuit bitstream for a decryption circuit and an encrypted bitstream, according to an embodiment of the invention.

For example, FIG. 5a shows a single input bitstream BSi(1) that includes an evolved circuit bitstream BSc and an encrypted bitstream BSe. Input bitstream BSi(1) can be loaded into a reprogrammable logic IC, such as IC 400 shown in FIG. 4a, to configure that IC. Note that evolved circuit bitstream BSc can be part of a larger decryption circuit bitstream BSdc, as indicated by the dotted lines. For example, if the entire decryption circuit were an evolved circuit (e.g., the entire decryption circuit, rather than just key generator 411 shown in FIG. 4a, were formed from configuration set 410) decryption circuit BSdc might include some IP for configuring static elements within the configuration set of reprogrammable logic, or even outside the configuration set. In an embodiment where the security key is created during encryption by an evolved circuit and stored in a nonvolatile key register, decryption circuit bitstream BSdc need not include evolved circuit bitstream BSc.

Figure 5B:
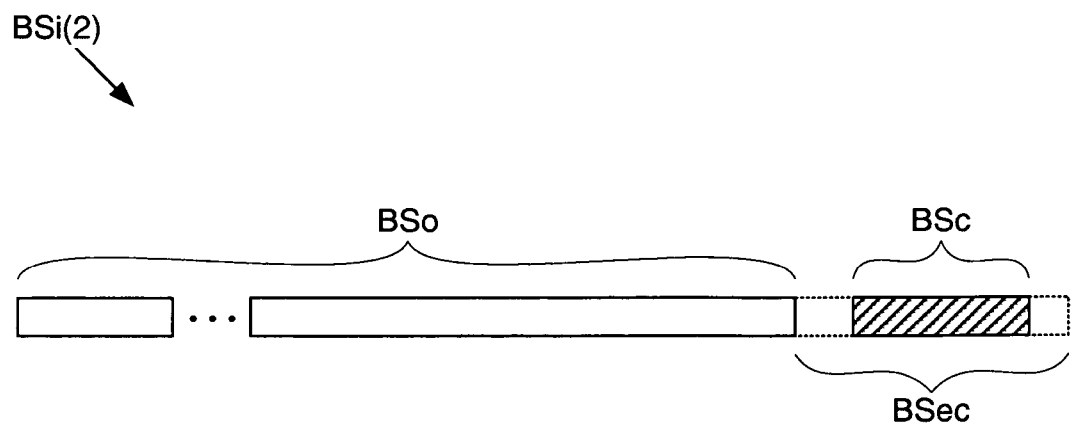
FIG. 5b is a schematic diagram of a bitstream including both an evolved circuit bitstream for an encryption circuit and an unencrypted bitstream, according to another embodiment of the invention.

Similarly, FIG. 5b shows a single input bitstream BSi(2) that includes evolved circuit bitstream BSc, as well as an original (unencrypted) bitstream BSo. Input bitstream BSi(2) can be fed into a reprogrammable logic IC, such as IC 400 shown in FIG. 4b, to generate encrypted bitstream BSe by encrypting original bitstream BSo using the evolved circuit programmed by evolved circuit bitstream BSc. Just as with input bitstream BSi(1) shown in FIG. 5a, evolved circuit bitstream BSc can be part of a larger encryption circuit bitstream BSec, as indicated by the dotted lines.

Note that FIGS. 5a and 5b depict input bitstreams that include both decryption circuit bitstream BSdc and an associated encrypted (BSe) or original (BSo) bitstream. In contrast, FIGS. 5c and 5d depict decryption circuit bitstreams that are separate from their associated encrypted or original bitstreams, respectively.

Figure 5C:
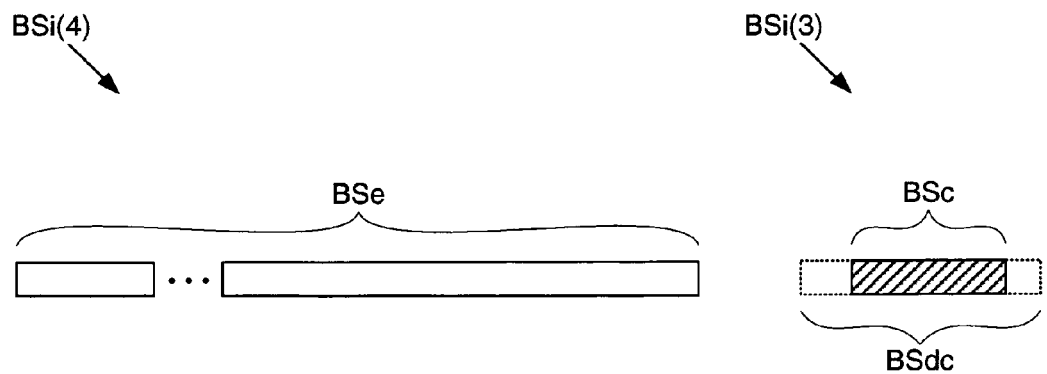
FIG. 5c is a schematic diagram showing an encrypted bitstream and a separate decryption circuit bitstream including an evolved circuit, according to another embodiment of the invention.

For example, FIG. 5c shows two separate input bitstreams BSi(3) and BSi(4) that can be used to configure a reprogrammable logic IC (such as IC 400 shown in FIG. 4a). Input bitstream BSi(3) includes evolved circuit bitstream BSc (which can be part of a larger decryption circuit bitstream BSdc), while input bitstream BSi(4) includes encrypted bitstream BSe. Therefore, input bitstream BSi(3) can be provided to the IC to initially configure a decryption circuit in the IC. At some later point in time, input bitstream BSi(4) can be provided to the IC, which then decrypts encrypted bitstream BSe and uses the resulting decrypted bitstream to place the IC in a desired final configuration. As previously explained in connection with FIG. 5a, in some embodiments, decryption circuit bitstream BSdc does not need to include evolved circuit bitstream BSc.

Figure 5D:
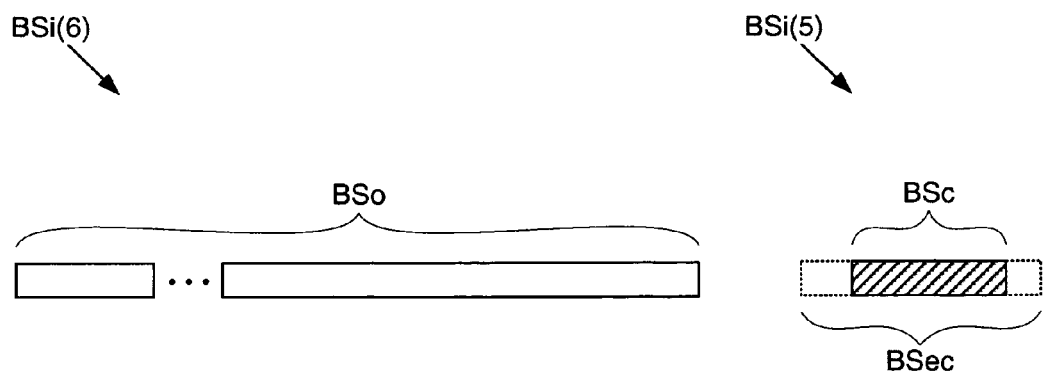
FIG. 5d is a schematic diagram showing an unencrypted bitstream and a separate encryption circuit bitstream including an evolved circuit, according to another embodiment of the invention.

Similarly, FIG. 5d shows two separate input bitstreams BSi(5) and BSi(6) that can be used to generate an encrypted bitstream from an original (unencrypted) bitstream BSo, such as described with respect to FIG. 4b. Input bitstream BSi(5) includes evolved circuit bitstream BSc (which can be part of a larger encryption circuit bitstream BSec), while input bitstream BSi(6) includes original bitstream BSo. Therefore, input bitstream BSi(5) can be provided to the IC to initially configure an encryption circuit in the IC. At some later point in time, input bitstream BSi(6) can be provided to the IC, which then encrypts original bitstream BSo to generate encrypted bitstream BSe.

Figure 6A:
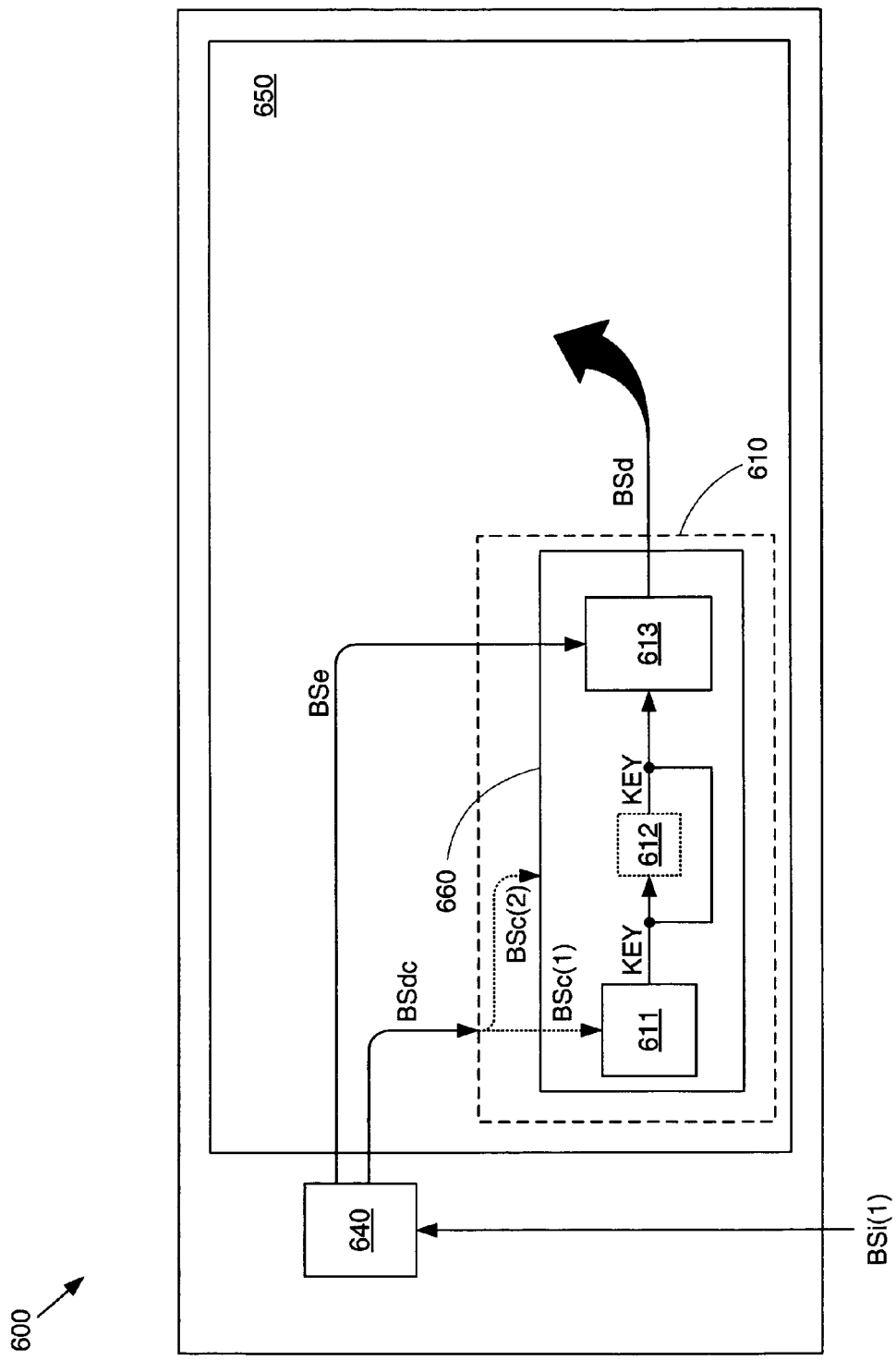
FIG. 6a is a schematic diagram of a reprogrammable logic IC including a decryption circuit in accordance with another embodiment of the invention.

FIG. 6a shows a reprogrammable logic IC 600 that is configured to include an evolved circuit as part of a larger decryption circuit implemented in reprogrammable logic, in accordance with another embodiment of the invention. IC 600 includes programming circuitry 640 and reprogrammable logic resources 650 (which can include CLBs, IOBs, and programmable routing resources (not shown for clarity)).

Programming circuitry 640 is coupled to receive an input bitstream BSi(1), which includes a decryption circuit bitstream BSdc. Programming circuitry 640 passes decryption circuit bitstream BSdc to a development logic set 610 that comprises a predetermined portion of reprogrammable logic resources 650. Decryption circuit bitstream BSdc then configures development logic set 610 into a decryption circuit 660 that decrypts an encrypted bitstream BSe into a decrypted configuration bitstream BSd. Decrypted configuration bitstream BSd then configures the unprogrammed portions of reprogrammable logic resources 650 into a desired logic configuration. Thus, unlike reprogrammable logic IC 400 shown in FIGS. 4a and 4b, reprogrammable logic IC 600 does not include a dedicated bitstream decoder, but rather has its entire decryption circuit implemented within reprogrammable logic resources 650.

Decryption circuit 660 comprises an evolved circuit configured by an evolved circuit bitstream BSc that is part of decryption circuit bitstream BSdc. As noted previously with respect to FIGS. 5a and 5b, whether evolved circuit bitstream BSc comprises the entire decryption circuit bitstream BSdc or just a portion depends on whether the evolved circuit is a portion of, or the complete decryption circuit, respectively. For example, decryption circuit bitstream BSdc can include an evolved circuit bitstream BSc(1) that configures a key generator 611, with the remainder of decryption circuit bitstream BSdc configuring static elements within decryption circuit 660, such as a bitstream decoder 613 and an optional key register 612. Bitstream decoder 613 is then able to decode encrypted bitstream BSe into decrypted bitstream BSd using security key KEY provided either directly by key generator 611, or by optional key register 612. As noted preciously, in some embodiments the security key KEY generated by key generator 611 can be stored persistently, for instance in a nonvolatile key register 612. In such embodiments, evolved circuit bitstream BSc is not required to be part of decryption circuit bitstream BSdc, since the security key can be retrieved from the nonvolatile storage.

Alternatively, decryption circuit bitstream BSdc can consist entirely of an evolved circuit bitstream BSc(2) that configures the entire decryption circuit 660. As noted previously, a decryption circuit formed entirely from an evolved circuit can use a key-based decryption algorithm, or else can directly convert between encrypted and decrypted configuration bitstreams.

Figure 6B:
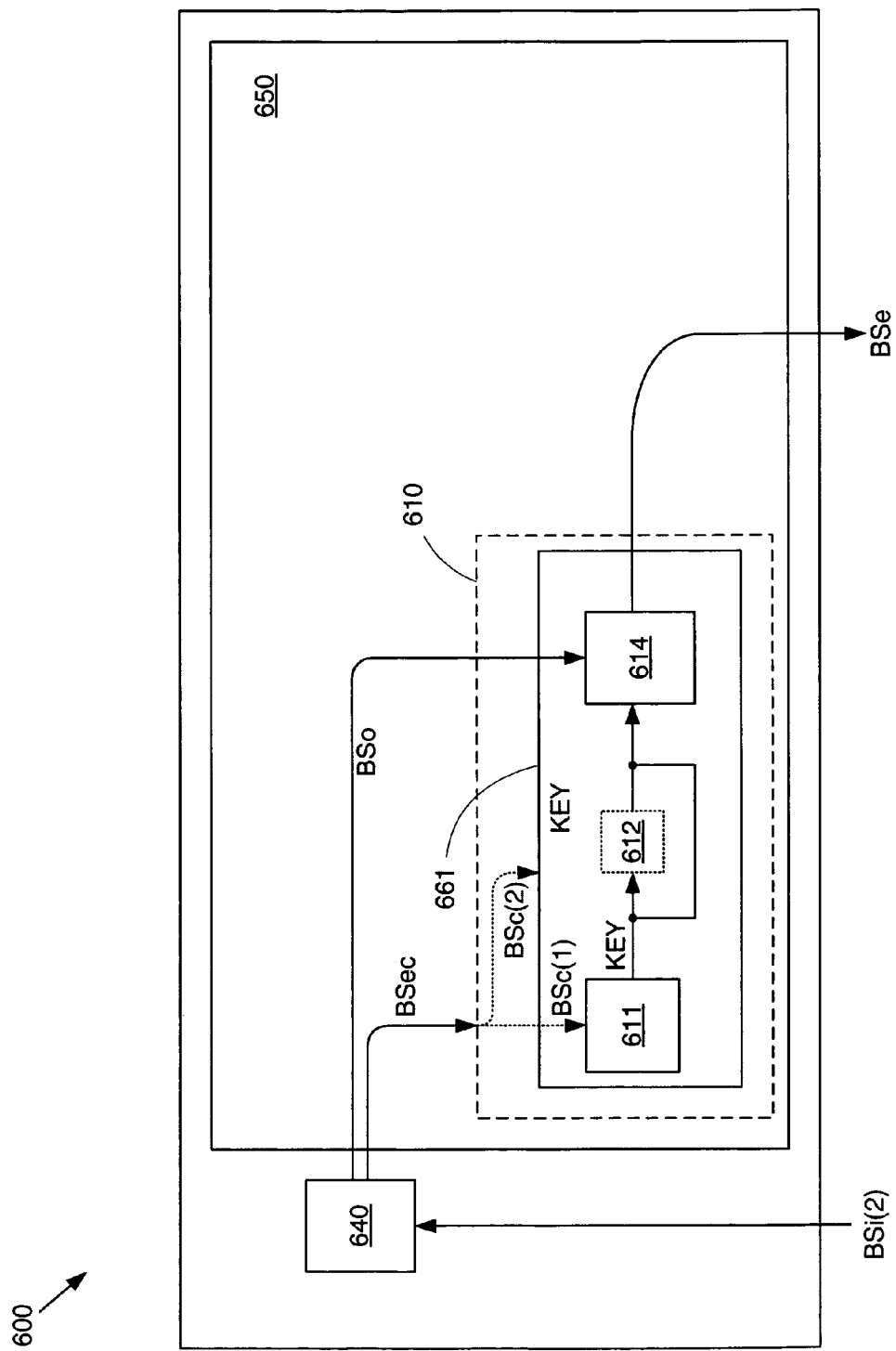
FIG. 6b is a schematic diagram of the reprogrammable logic IC of FIG. 6a including an encryption circuit in accordance with another embodiment of the invention.

IC 600 can also be configured to encrypt original bitstream data using the same evolved circuitry (e.g., key generator 611) used in the decryption process. For example, FIG. 6b shows IC 600 configured to include an evolved circuit as part of a larger encryption circuit implemented in reprogrammable logic, in accordance with another embodiment of the invention. Therefore programming circuitry 640 is coupled to receive an input bitstream BSi(2) that includes an original (unencrypted) bitstream BSo. Input bitstream BSi(2) also includes the same evolved circuit bitstream BSc(1) described with respect to FIG. 6a, but as part of an encryption circuit bitstream BSec (rather than a decryption circuit bitstream).

Upon receiving input bitstream BSi(2), programming circuitry 640 passes encryption circuit bitstream BSec to development logic set 610, which is then configured to include an encryption circuit 661. Encryption circuit 661 includes the key generator 611 configured by evolved circuit bitstream BSc(1), which generates the same security key KEY as generated by key generator 611 of the decryption circuit shown in FIG. 6a (since the two key generators are the same). The remainder of encryption circuit bitstream BSec configures the remainder of encryption circuit 661, including a bitstream encryptor 614 and an optional key register 612. Bitstream encoder 614 can then encode original bitstream BSo into encrypted bitstream BSe using security key KEY provided either directly by key generator 611, or by optional key register 612.

The various embodiments of the structures and methods of this invention that are described above are illustrative only of the principles of this invention and are not intended to limit the scope of the invention to the particular embodiments described. For example, key generator 411 in FIG. 4a could simply be used to generate a substantially unique ID number that could be used to identify and authenticate reprogrammable logic system 400 for subsequent configuration bitstream loading. Thus, the invention is limited only by the following claims and their equivalents.

We claim:

1. A configuration bitstream for a particular reprogrammable integrated circuit (IC), the configuration bitstream comprising:
an evolved circuit bitstream for configuring an evolved circuit in the reprogrammable IC, the evolved circuit bitstream being defined by an iterative configuration process based on a predetermined security-based evaluation function, the evolved circuit generating a constant output for a given input each time the evolved circuit is implemented in the particular reprogrammable IC based upon at least one physical property associated with a process variation of the particular reprogrammable IC, wherein the iterative configuration process results in a design for the evolved circuit based upon the at least one physical property associated with the process variation of the particular reprogrammable IC and the evolved circuit enables decrypting an encrypted bitstream for the particular reprogrammable IC.

2. The configuration bitstream of claim 1, wherein the configuration bitstream further comprises a decryption circuit bitstream for implementing a decryption circuit in the particular reprogrammable IC, the decryption circuit bitstream including the evolved circuit bitstream.

3. The configuration bitstream of claim 2, further comprising the encrypted bitstream to be decrypted by the decryption circuit.

4. The configuration bitstream of claim 1, wherein the configuration bitstream further comprises an encryption circuit bitstream for implementing an encryption circuit in the particular reprogrammable IC, the encryption circuit bitstream including the evolved circuit bitstream.

5. The configuration bitstream of claim 1, wherein the particular reprogrammable IC comprises a field programmable gate array.

6. A method for encrypting a configuration bitstream for a particular reprogrammable integrated circuit (IC) having reprogrammable resources, the method comprising:
    evolving an evolved circuit by applying an iterative configuration process to a portion of the reprogrammable resources until the portion of the reprogrammable resources satisfies a predetermined security-based evaluation function, wherein the iterative configuration process results in a design for the evolved circuit based upon at least one physical property associated with a process variation of the particular reprogrammable IC and;
    incorporating the evolved circuit into a decryption circuit in the particular reprogrammable IC, wherein the evolved circuit will generate a constant output for a given input each time the evolved circuit is implemented in the particular reprogrammable IC based upon the at least one physical property associated with the process variation of the particular reprogrammable IC and enables the decryption circuit to decrypt an encrypted configuration bitstream for the particular reprogrammable IC; and
    encrypting the configuration bitstream to be decrypted by the decryption circuit.

7. The method of claim 6, wherein the evolved circuit comprises a first counter having a weakly specified frequency, and wherein encrypting the configuration bitstream comprises:
    implementing the decryption circuit in the particular reprogrammable IC;
    reading a plurality of counter results from the evolved circuit at regular intervals;
    combining the plurality of counter results to generate a security key for the decryption circuit; and
    encrypting the configuration bitstream using the security key.

8. The method of claim 6, wherein encrypting the configuration bitstream comprises:
    generating an encryption key using the evolved circuit, wherein the configuration bitstream comprises a first quantity of bits, and wherein the encryption key comprises a second quantity of bits, the first quantity being equal to the second quantity; and
    performing an XOR operation on the configuration bitstream and the encryption key.

9. The method of claim 6, wherein evolving the evolved circuit comprises:
    selecting the portion of the reprogrammable resources;
    defining the security-based evaluation function;
    loading a candidate bitstream into the particular reprogrammable IC to configure the portion of the reprogrammable resources into a logic configuration;
    comparing a sample output from the logic configuration against a desired output from the security-based evaluation function; and
    modifying and reloading the candidate bitstream into the particular reprogrammable IC to reconfigure the portion of the particular reprogrammable resources until the sample output matches the desired output.

10. The method of claim 9, wherein modifying and reloading the candidate bitstream comprises applying a random permutation to the candidate bitstream.

11. The method of claim 9, wherein modifying and reloading the candidate bitstream comprises locking selected bits in the candidate bitstream to prevent modification of those selected bits.

12. The method of claim 9, wherein loading the candidate bitstream into the particular reprogrammable IC comprises combining the candidate bitstream with a predefined static circuit bitstream.

13. The method of claim 9, wherein the security-based evaluation function comprises a constant output function.

14. The method of claim 13, wherein the constant output function specifies a specific signal for the desired output.

15. The method of claim 9, wherein the security-based evaluation function is applied across a range of temperatures for the particular reprogrammable IC.

16. The method of claim 9, wherein the security-based evaluation function is applied across a range of supply voltages for the particular reprogrammable IC.

17. The method of claim 6, wherein encrypting the configuration bitstream comprises generating a security key using the evolved circuit, further comprising:
    storing the security key in a nonvolatile memory in the particular reprogrammable IC.

18. A method for distributing a configuration bitstream for a particular reprogrammable integrated circuit (IC), the method comprising:
    designing a decryption circuit for the particular reprogrammable IC, the decryption circuit comprising an evolved circuit developed by applying an iterative configuration process to a set of resources in the particular reprogrammable IC until the set of resources satisfies a predetermined evaluation function, wherein the iterative configuration process results in a design for the evolved circuit based upon at least one physical property associated with a process variation of the particular reprogrammable IC and;
    creating an encrypted bitstream to be decrypted into the configuration bitstream by the decryption circuit;
    shipping the particular reprogrammable IC to a user;
    providing a decryption circuit bitstream to the user, the decryption circuit bitstream implementing the decryption circuit when loaded into the particular reprogrammable IC, wherein the evolved circuit of the decryption circuit will generate a constant output for a given input each time the evolved circuit is implemented in the particular reprogrammable IC based upon the at least one physical property associated with the process variation of the particular reprogrammable IC and enables the decryption circuit to decrypt the encrypted bitstream; and
    providing the encrypted bitstream to the user.

19. The method of claim 18, wherein the evolved circuit comprises a key generator for generating a security key, wherein the decryption circuit performs decryption using the security key, and wherein creating the encrypted bitstream comprises:
    reading the security key from the particular reprogrammable IC; and
    encrypting the configuration bitstream into the encrypted bitstream using the security key.

20. The method of claim 18, wherein the evolved circuit comprises a key generator for generating a security key, wherein the decryption circuit performs decryption using the security key, and wherein creating the encrypted bitstream comprises:
    implementing the evolved circuit in the particular reprogrammable IC;

implementing an encryption circuit in the particular reprogrammable IC, the encryption circuit being coupled to receive the security key from the evolved circuit, the encryption circuit performing encryption using the security key; and providing the configuration bitstream to the encryption circuit to encrypt the configuration bitstream into the encrypted bitstream.

* * * * *